June 21, 1966   M. D. HOSTETTER   3,256,622
TOOTH RETAINER ASSEMBLY
Original Filed June 20, 1960
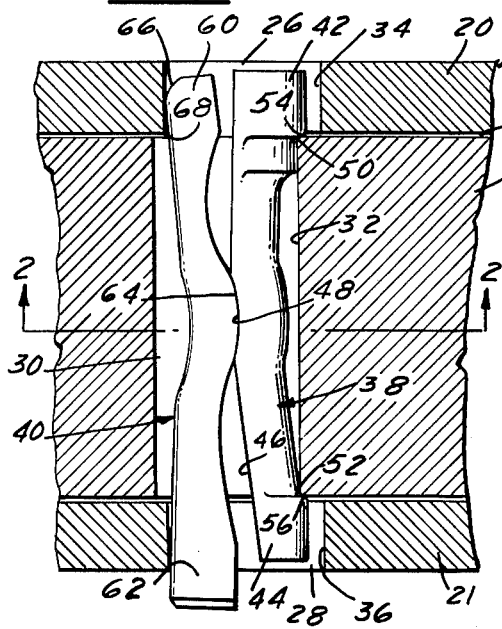
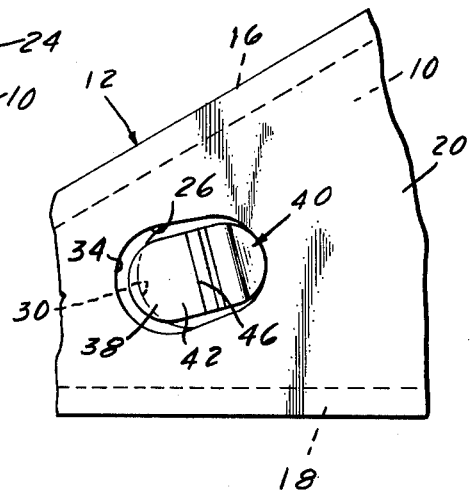
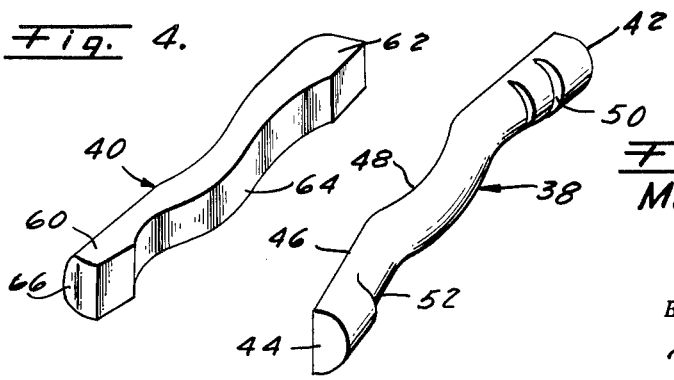
Morgan D. Hostetter,
INVENTOR.
BY 
Attorney

United States Patent Office 3,256,622
Patented June 21, 1966

3,256,622
TOOTH RETAINER ASSEMBLY
Morgan D. Hostetter, West Covina, Calif., assignor, by direct and mesne assignments, to William Douglas Sellers and George A. Brace
Filed Dec. 24, 1964, Ser. No. 423,900
15 Claims. (Cl. 37—142)

This application is a continuation of my copending application for United States Letters Patent Serial No. 37,129, filed June 20, 1960, entitled Excavating Tooth Retaining Means and now abandoned.

This invention relates generally to releasable retainer or locking means and relates more particularly to releasable retainer or locking means for securing replaceable dipper teeth for excavating buckets and the like to the tang or lips of such buckets.

While the invention has particular utility in connection with the releasable securing of dipper teeth of dragline buckets, scoops, dippers, power shovels, and the like, and is shown and described in such connection, it is to be understood that its utility is not confined thereto.

As is well known, considerable difficulty has been encountered in providing a suitable retaining or locking means for attaching dipper teeth to the lips of excavating buckets and the like. One of the difficulties encountered has been the working loose of the teeth due to the heavy stresses to which they are subjected during the digging action.

It is therefore, an object of the present invention to provide retaining means for bucket teeth and the like which will overcome said difficulties or problems.

It is another object of the present invention to provide retaining or locking means whereby the teeth may be securely attached to the lips of the buckets or the like.

Still another object of the invention is to provide retainer or locking means of this character whereby the teeth may be securely held in proper position but may be readily and easily removed.

A further object of the invention is to provide means of this character whereby the teeth may be easily and quickly attached to the supporting parts provided therefor.

A still further object of the invention is to provide retaining means of this character which will not work loose under various conditions of operation of the bucket or the like to which said teeth are secured.

Another object of the invention is to provide means of this character which has resilient characteristics and which will retain locking pressure on the respective teeth and on the parts to which said teeth are attached.

Still another object of the invention is to provide means of this character comprising a pair of members which are easy to position relative to each other and which when thus positioned will not become displaced from the locking position.

A further object of the invention is to provide means of this character that is simple in construction.

A still further object of the invention is to provide means of this character that are relatively inexpensive to manufacture.

The characteristics and advantages of the invention are further sufficiently referred to in connection with the following detailed description of the accompanying drawings which disclose one arrangment. After considering this example, skilled persons will understand that variations may be made without departing from the principles disclosed, and any structures, arrangements or modes of operation that are properly within the scope of the appended claims are contemplated.

Referring more particularly to the drawings which are for illustrative purposes only:

FIGURE 1 is a fragmentary view of a digger tooth and mounting therefor with the retaining or locking means of the present invention in operative position;

FIGURE 2 is a sectional view taken on line 2—2 of FIGURE 1;

FIGURE 3 is a side elevational view of the retaining means as viewed in FIGURE 1; and FIGURES 4 and 5 are perspective views of the respective parts of the retaining means.

Referring now more particularly to the drawings, there is shown a tooth support or tang 10 on which is mounted in the usual manner a digger tooth, indicated generally at 12. The tooth has a digging point 14 and a pair of upper and lower walls 16 and 18 diverging therefrom. There are also side walls 20 and 21 which, with the walls 16 and 18, provide a recess 24 into which the forward tapering part of the supporting means or tang 10 is received. It is to be noted that the upper and lower faces of the tang 10 are snugly disposed against the inner sides of the walls 16 and 18 when the tooth is locked on said tang.

The side walls 20 and 21 of the tooth are provided with aligned, somewhat oval shaped, openings 26 and 28 respectively, said openings being of substantially the same size and configuration relative to each other.

Tang 10 is provided with a transverse opening 30 of generally oval shape, and when the tooth 12 is properly disposed on the tang 10, the forward portion 32 of opening 30 is positioned somewhat rearwardly of the forward ends 34 and 36 of the respective openings 26 and 28.

There are a pair of retainer, locking members or pins, indicated generally at 38 and 40, said pins or members being of very hard resilient material, such as highly tempered spring steel or the like.

The member 38 of the locking means is somewhat shorter than the width of the tooth and is provided at its opposite ends with heads 42 and 44 respectively. The rear or inner side 46 of the pin or member 38 is relatively flat and said pin is generally bowed rearwardly at the center, there being, however, a rearwardly facing concave portion 48 adjacent the longitudinal center of said member 38. At the inner ends of the respective heads 42 and 44 there are forwardly facing shoulders 50 and 52 which, when the pin or member 38 is positioned in the openings 26, 28 and 30, as thus shown in FIGURE 1, seat against the outer edges 54 and 56 of the forward end of opening 30. Pin or member 38 is inserted into said opening prior to the insertion into said opening of the pin or member 40.

Pin or member 40 is somewhat longer than the pin 38 and is provided with a tapered wedge-like end 60 and a driving head 62 at the opposite end. There is a forwardly bowed or convex portion 64 adapted to seat in the concave portion 48 of the pin 38 when the pins or members are in their locking position as shown in FIGURE 1.

As is made clear by FIGURE 1 the two pins 38 and 40 taper in opposite directions, pin 38 being relatively thin opposite shoulder 52 and relatively thick opposite shoulder 50, and the reverse conditions being true of the corresponding ends of pin 40. This design greatly facilitates assembly of the pins and discourages attempts to assemble them from the wrong ends, it being noted that with pin 38 in place there is a relatively wide entrance at end 44 of pin 38 for the tapered end of pin 40 but a very narrow opening at the other end of pin 38.

After the pin or member 38 has been positioned in the openings 26, 28 and 30, as shown in FIGURE 1, the pin or member 40 is inserted into the opening 26 and adjacent portion of the opening 30 as far as possible and thereafter is driven into the position shown in FIGURE 1 by any suitable means, such as by blows applied with a hammer or the like to its blunt end 62.

Although the pins or members 38 and 40 are made of resilient material such as tempered steel, they will yield sufficiently to permit the bowed part 64 to move into the concave part 48 of the pin 38 as said pin 40 is driven home. The side of the pin 40 facing the pin 38 is relatively flat and the end or head 62 projects outwardly of the outer side of wall 20 when the pins 38 and 40 are in their locking position. It is to be noted that when the pin 40 is being driven into position the rounded or tapered surface 66 of the wedge end 60 provides a cam surface whereby the leading or wedge end of said pin 40 will pass over the rear inner edge 68 of the opening 26.

When pins 38, 40 are in their proper assembled positions as shown in FIGURE 1, they are highly stressed because deformed toward each other and toward a plane parallel to their flat surfaces passing between their outer ends. Owing to the massiveness of the pins, and the highly resilient properties of the steel employed therein, it will be recognized that the pins are highly stressed and tensioned lengthwise thereof with the ends of pin 38 pressed powerfully and continuously against the forward side of tang opening 32 and toward the pointed forward end of tooth 12 and the outer ends of pin 40 are pressed powerfully and continuously rearwardly against the rear edges of openings 34, 36 in the tooth sidewalls. As is made clear by FIGURES 2 and 3, the ends of pin 38 do not contact any part of the tooth and the ends of pin 40 do not contact any part to the tang. In view of these facts, it will be recognized that the full force of the highly stressed pins is utilized to hold the tooth constantly and powerfully pressed rearwardly against the forwardly facing seating surface of the tang. Furthermore owing to the small angle taper present in both pins and their great resilient strength powerful friction forces are created during the assembly operation between their contacting midsurfaces and between the exterior outer surfaces of pin 40 and the rear edges of the openings in the tooth sidewalls. These friction forces, aided by the interfitting surfaces 48, 64 and the interlock between the tang and the shouldered ends of pin 38, provide assurance against disassembly of the pins unless and until pin 40 is driven out by blows applied to a pin in contact with its tapered end 60.

The invention and many of its attendant advantages will be understood from the foregoing description and it will be apparent that various changes may be made in the form, construction and arrangement of the parts of the invention without departing from the spirit and scope thereof or sacrificing its material advantages, the embodiment hereinbefore described being merely for purposes of illustration.

I claim:

1. An excavating tooth assembly wherein the tooth is constantly and resiliently urged against its seat comprising, a wedge-shaped tang with the point projecting forwardly and a generally wedge-shaped tooth telescopically seated on said tang, said tooth including a top wall, bottom and side walls, said side walls having aligned openings therein, said tang having a transverse opening of uniform cross section in general registry with said side wall openings but offset slightly therefrom toward the base of the tang when the tooth is snugly seated thereon, retaining means for holding said tooth and tang in seated engagement comprising a pair of dissimilar resilient pins of semi-circular shape in cross section, one of said pins being shorter than the other and slightly shorter than the width of the tooth, said pins having relatively flat adjacent sides lying generally normal to the top surface of said tang and being provided with a complementally shaped hump and recess crosswise of their contacting midportions, the shorter one of said pins having shouldered ends engageable with the forward rim edge portions of said tang opening and spaced from the upper and lower edges and from the forward ends of the openings in said tooth side walls, the longer pin being somewhat longer than the width of the tooth and having non-shouldered portions at both ends thereof disposed in the portion of said tang opening remote from the pointed end of the tooth in the assembled position thereof, the rounded rearwardly facing end portions of said longer pin engaging the rear ends of the respective openings in the tooth side walls and being spaced from and out of contact with the rear portions of the tang opening, said resilient pins being slightly bowed toward each other and highly stressed in their assembled position and thereby effective to hold the shouldered ends of said shorter pin pressed against forward wall portions of the opening through said tang and with the rearwardly facing rounded ends of said longer pin pressed against the juxtaposed rear edges of the opening in said tooth side walls to hold the tooth constantly and resiliently seated against the forwardly facing end of said tang.

2. An excavating tooth assembly wherein the tooth is constantly and resiliently held pressed in fully seated position on a supporting tang therefor comprising, a wedge-shaped tang with is point projecting forwardly and a tooth having a pointed end snugly seated thereon, said tooth including a top wall and side walls integral therewith, said side walls having aligned horizontal openings therein and said tang having a horizontal transverse opening in general registry with said side wall openings but slightly offset rearwardly from the axis thereof, retaining means comprising a pair of dissimilar highly resilient pins of massive semi-circular cross section, said pins being slightly bowed lengthwise thereof with their adjacent ends spaced apart and their contacting midportions having transverse mating hump and recessed means for holding said pins locked against relative endwise movement when in assembled position, one of said pins having shouldered ends engageable with the forward edges of the opening in the tang and spaced from the forward portions of the tooth side wall openings, the other pin having unshouldered ends a first one of which is tapered to facilitate lengthwise assembly of the pin through said openings, said unshouldered ends when assembled being constantly and resiliently pressed rearwardly against the juxtaposed edges of said tooth side wall openings and out of contact with the transverse opening through said tang and cooperating with the other of said bowed pins to urge said tooth constantly seated against the forward side of said tang, and the second end of said unshouldered pin being larger than said tapered end and being flat transversely thereof and adapted to take strong hammer glows while the pin is being driven lengthwise into assembled position after said shouldered pin is seated in its normal assembled position.

3. An excavating tooth assembly the components of which are held constantly pressed together in assembled relation by the powerful resiliency of certain of the components comprising, a pointed tang with the point projecting forwardly, a pointed tooth seated against the front face of said tang, said tooth including a top wall and integral side walls having horizontally aligned openings therein, said tang having a transverse opening of uniform cross section in general registry with but offset slightly forwardly of the axis of said side wall openings, retaining means holding said tang and tooth resiliently assembled under constant pressure comprising a pair of elongated highly-resilient dissimilar oppositely bowed pins in high-pressure contact at their midportions, one of said pins being located at the forward portion of said tang opening and the other being located in the rear portion of the tang opening and relatively remote from the pointed end of said tang the ends of one pin being constantly loaded against the foremost side wall of said tang opening and generally out of contact with the tooth side walls, the ends of the other pin being constantly loaded against the rearward portions of the tooth side wall openings and effective to urge said tooth constantly into high pressure contact with the front end of said tang, said one pin being shaped to have interlocking engagement with the opposite lateral faces of said tang in the assembled position thereof, and said other pin being wedge-shaped at one end and blunt at its opposite end whereby the same is adapted to be driven endwise through said openings to place said oppositely bowed pins under high resilient stress as strong blows are applied to its blunt end.

4. An excavating tooth assembly the components of which are held in constant high-pressure assembled relation and free of lost motion therebetween, said assembly comprising a rigid tang having a forwardly-facing tooth-supporting surface, a pointed tooth shaped to be held immovably seated against said tang surface, a noncircular opening of uniform cross section from end-to-end thereof extending transversely through said tang rearwardly of said tooth seating surface and having integral side walls positioned closely beside the opposite sides of said tang, said side walls having horizontally aligned noncircular openings therethrough the axis of which is offset forwardly from the axis of said tang opening in the seated assembled position of said tooth and tang whereby portions of the rear edges of said side wall openings protrude forwardly of portions of the rear edges of said tang opening and whereby portions of the forward edges of said side wall openings protrude forwardly of portions of the forward edges of said tang opening, a pair of elongated retainer pins adapted to be assembled endwise through said openings to lock said tooth and tang resiliently assembled, said pins being dissimilar in shape with generally flat adjacent faces lying generally normal to the top surface of said tang, the forward one of said pins having shouldered ends overlapping the forward rim edge portions of said tang opening and bearing only against the foremost end portions of said tang opening, the other of said pins being tapered at one end and blunt at its opposite end and bowed lengthwise thereof with its flat midportion bearing under high pressure against the flat midportion of said one pin and its opposite ends bearing under high pressure against the juxtaposed rear edge portions of the aligned openings in the tooth side wall and out of contact with said tang opening, said bowed pin being highly resilient and strongly resisting deflection while being driven lengthwise into assembled position and thereafter being effective in cooperation with the other of said pins to urge said tooth rearwardly in constant pressure contact with the forwardly facing surface of said tang.

5. An excavating tooth assembly as defined in claim 4 characterized in that both of said pins are substantially thicker at one end than at the other in a direction normal to the flat faces thereof, and the thicker ends of said pins being located one adjacent a different one of said tooth side walls and the tapered smaller end of one pin being designed for endwise assembly past the smaller end of the other pin.

6. An excavating tooth assembly as defined in claim 5 characterized in that said tooth side wall openings and said tang opening are generally elliptical in cross section with the major axes of all openings being generally coplanar, and the flat faces of said pins being acutely inclined to the vertical in the normal operating position of said assembly whereby said retainer pins are held oriented in a proper position to urge said tooth constantly seated against the seating surface therefor on said tang.

7. Retainer pin means for cooperative highly-stressed assembly to hold a pair of members constantly and resiliently seated against one another, said retainer means comprising a pair of highly tempered steel pins having flat adjacent faces in contact in their midlengths and bowed away from one another at their opposite ends, both of said pins having a relatively thin and a relatively thick blunt end disposed remotely from one another in their assembled positions, one of said pins having radially directed lugs protruding from its ends adapted to prevent endwise movement of said one pin when assembled in an opening slightly shorter than the axial distance between said lugs, the other of said pins being smooth-surfaced and free of radially directed lugs at its ends and tapering at its thinner end to facilitate the assembly thereof endwise past the thinner end of the other pin, and said pins being adapted to be held frictionally assembled with their flat midportions in high-pressure contact and their respective opposite ends spaced radially apart but held stressed toward one another by contact with the juxtaposed edges of openings in which said pins have been forcibly assembled.

8. In combination with a supporting shank having a transverse bore and a cooperating excavating tooth seated thereon having aligned openings in the side walls thereof offset lengthwise of said shank from registry with the adjacent ends of said bore, retaining means for maintaining the tooth and shank in telescoped relation comprising; a pair of oppositely-tapering longitudinally-bowed resilient pin members each longer than the width of said shank and only one of which is formed with shoulders at its ends, said shouldered pin member being insertable to its assembled position first with its shouldered ends located exteriorly of said bore and the other pin member then being insertable forcibly and endwise past the smaller end of said shouldered pin, the end portions of one of said pin members being in high pressure contact only with the shank and the end portions of the other of said pin members being urged in high pressure contact only with the tooth side walls, cooperating means on the pin members and shank to preclude axial movement of the pin members with respect to the shank, said pin members being in contact with each other at their respective midportions and resiliently tensioned thereby toward a straight line position to activate said cooperating means.

9. In combination with a supporting shank having a transverse bore and a cooperating excavating tooth seated thereon having aligned openings in the side walls thereof offset from true registry with the adjacent ends of said bore, retaining means for maintaining the tooth and shank in telescoped relation comprising; a pair of oppositely-tapering longitudinally-bowed resilient pin members each longer than said bore and extending through said bore and into said openings, one of said pin members being formed with shoulders shaped inwardly of its opposite ends and the other of said pin members being free of shoulders and having a tapered end to facilitate driving the same endwise into the locked assembled position of said retaining means, the end portions of one of said pin members being held in continuous high-pressure contact only with the shank and the end portions of the other of said pin members being held in high-pressure contact only with the tooth side walls, cooperating means on the pin members and shank to preclude axial movement of the pin members with respect to the shank, said pin members being in contact with each other at their respective midportions and resiliently tensioned thereby toward a straight line position to activate said cooperating means and to stress said pin ends into high-pressure contact respectively with said shank and with said tooth.

10. In an excavating tooth assembly of the type having a forwardly-directed wedge-shaped supporting tang and a demountable excavating tooth formed with a pointed forwardly-directed digging end and an oppositely directed mounting cavity seated firmly over said wedge-shaped tang, said assembled tooth and tang having aligned transverse openings of generally elliptical shape so disposed that their respective major axes extend generally lengthwise of said tooth and its supporting tang, resilient retainer means removably seated in said aligned openings for locking said tooth to said tang in powerful continuously-applied readwardly-acting resilient contact with the wedge-shaped end thereof, said retainer means comprising a plurality of elongated dissimilar members each having a relatively thick end and a relatively thin end and tapering in thickness lengthwise of said retainer means, said members each having juxtaposed flat surfaces extending lengthwise of said retainer means, said members being insertable through said aligned openings separately and sequentially with their respective smaller ends located remotely from one another and spaced laterally from the adjacent thick end of the other of said members, and the adjacent thick and thin ends of said members at each end of said retainer means being located at the opposite major-axis ends of said elliptically shaped openings, at least one of said retainer members having its ends bowed away from the ends of the other member and being strongly resilient and cooperable with the other retainer member and with said tang to lock said tooth positively assembled to said tang and in resilient seating engagement with the tang at all imes and with the ends of one member pressed continuously against said tang opening on the side thereof adjacent the pointed end of said tooth and the exterior end surfaces of the other member pressed continuously against the sides of the openings in said tooth remote from the pointed end of said tooth.

11. An assembly as defined in claim 10 characterized in that a first one of said retainer members is formed with a shoulder near each of its opposite ends spaced apart longitudinally of said retainer by the transverse thickness of said shank and adapted to engage the forward rim edges of the opposite ends of the opening through said shank thereby to hold said retainer member positively assembled to said shank, and the other retainer member having smooth-surfaced outer surfaces at its opposite ends adapted to seat against the inner end walls of the elliptical openings in said tooth remote from the shouldered ends of said first retainer member and to cooperate with said first retainer member in pressing said tooth firmly and resiliently longitudinally of the wedge-shaped portion of said supporting tang.

12. An assembly as defined in claim 10 characterized in that said retainer members are generally semi-circular in cross section and have their flat sides facing toward one another when assembled to said shank and the tooth thereon, and generally complementally shaped detent means and recess means extending transversely respectively of said flat sides in an area generally centrally of the length of said members and effective to hold said members locked firmly in place.

13. An assembly as defined in claim 12 characterized in that the second one of said retainer members is free of shoulders and protrusions on the surfaces thereof disposed on the opposite lateral side thereof from said flat side.

14. An assembly as defined in claim 10 characterized in that the relatively thin end of one of said members is relieved crosswise of the exterior rim edge thereof remote from the flat surface side of said one member thereby to facilitate assembly of said one member in said aligned openings, and the opposite relatively thick end of said one member having a broad flat end generally normal to the length of said one member.

15. An assembly as defined in claim 10 characterized in that the opposite ends of one of said members is provided with substantially right angle shoulders positioned to seat against the end rim edges of the opening through said tang, said shoulders being on the outer face of said one member and remote from the flat surfaced portion of said one member.

References Cited by the Examiner
UNITED STATES PATENTS

| | | | |
|---|---|---|---|
| 3,022,586 | 2/1962 | Towne | 37—142 |
| 3,175,314 | 3/1965 | Williamson | 27—142 |

ABRAHAM G. STONE, *Primary Examiner.*

WILLIAM A. SMITH, III, *Examiner.*